United States Patent [19]

Thompson et al.

[11] Patent Number: 4,965,685
[45] Date of Patent: Oct. 23, 1990

[54] REMOVABLE CARTRIDGE DISC DRIVE WITH RADIAL ARM VOICE COIL ACTUATOR

[75] Inventors: Herbert E. Thompson, Los Gatos; Donald L. Rolph, Pleasanton; Dominic Mercurio, San Jose; Albert J. Guerini, Gilroy, all of Calif.

[73] Assignee: Syquest Technology, Fremont, Calif.

[21] Appl. No.: 359,385

[22] Filed: Jul. 3, 1989

Related U.S. Application Data

[62] Division of Ser. No. 160,708, Feb. 26, 1988, Pat. No. 4,870,518.

[51] Int. Cl.$^5$ .............................................. G11B 5/016
[52] U.S. Cl. ............................... 360/97.01; 360/99.06; 360/99.09; 360/99.12; 360/105
[58] Field of Search ............... 360/97.01, 99.08–99.09, 360/105, 104, 106, 99.06, 99.12

[56] References Cited

U.S. PATENT DOCUMENTS

| | | |
|---|---|---|
| 4,504,879 | 3/1985 | Toldi et al. .......................... 360/105 |
| 4,683,506 | 7/1987 | Toldi et al. .......................... 360/105 |
| 4,787,000 | 11/1988 | Schulze ............................... 360/105 |
| 4,796,131 | 1/1989 | Chang ................................. 360/106 |
| 4,829,396 | 5/1989 | Okutsu ................................ 360/105 |
| 4,833,550 | 5/1989 | Takizawa et al. ................... 360/75 |

Primary Examiner—John H. Wolff
Attorney, Agent, or Firm—Fliesler, Dubb, Meyer & Lovejoy

[57] ABSTRACT

A disc drive 20 includes a tray assembly 34 for positively seating and locking a cartridge 21 onto a spindle motor 82. The drive 20 includes heads 108, 110 mounted on a radial arm voice coil actuator assembly 112 and appropriate mechanisms including the arm control assembly 126 and the ratchet 124 and pawl projection 170 to ensure that the heads 108, 110 are properly loaded onto the disc 90 and that the cartridge 21 insertion and ejection process does not cause damage to the heads 108, 110 or the disc 90 contained in the cartridge 21. Further the drive 20 includes controls such as the cartridge load lever 32 and the release button 30 which are not exposed and cannot be accidentally tripped during data transfer operations.

21 Claims, 11 Drawing Sheets

FIG.-12C exceeds# REMOVABLE CARTRIDGE DISC DRIVE WITH RADIAL ARM VOICE COIL ACTUATOR This is a division of Ser. No. 07/160,708 filed 2-26-88, now U.S. Pat. No. 4,870,518 issued on Sept. 26, 1989.

FIELD OF INVENTION

The present invention is related to a disc drive and in particular to a disc drive capable of receiving a removable cartridge containing a memory media and which includes a radial arm voice coil mechanism.

BACKGROUND OF THE INVENTION

In the past there have been a number of attempts to make removable cartridge or media disc drives with varying degrees of success due to the difficulty in designing a compact, efficient, highly accurate and repeatedly operable disc drive arrangement at a reasonable price and within strict form factor constraints. Prior removable cartridge disc drives have form factors which include trays which must be selectively extended from the drive for receiving a cartridge and/or in addition buttons and levers which extend from the drive in order to facilitate the operation of the disc drive. Such designs are not satisfactory as they can tend to block the operations of a computer or other computer peripherals which are positioned adjacent to the disc drive. In addition when buttons and levers extend from a drive there is always the possibility that these members can be accidently touched or repositioned causing data to be lost.

Another consideration in the development of removable cartridge disc drives is that of accurately receiving and seating a cartridge in the drive and accurately and efficiently loading the disc drive heads onto the media in the cartridge. It is important that the cartridge be locked into position and that the heads not be damaged during the cartridge loading or cartridge unloading processes. Further it is desirable that should there be power failure, that there is a convenient and efficient manner of removing the cartridge without damage to the memory media or the heads. This is especially important when there is proprietary information on the cartridge which needs to be placed in a secure location when not being used. With many prior art drives it is very difficult to remove a cartridge without power to the drive and even if the cartridge can be removed there is the possibility that there would be damage to the recording media or to the drive heads.

With any prior art drives there is a need for the development and use of an appropriate actuation mechanism for efficiently and accurately positioning the head relative to the recording media. In the past both stepper motors and linear voice coil motors have been used. In the case of stepper motors, the discreet position of the stepper motor limit the track density of the media. In the case of the linear voice coil motors, while the heads are infinitely positionable, such motors have not been found to be cost effective as radial voice coils.

SUMMARY OF THE INVENTION

The present invention is directed over the disadvantages of the prior art.

An object of the present invention is to provide a removable media disc drive arrangement with an appropriate form factor which does not interfere with the operation of the computer system into which it is integrated.

It is an objective of the invention to provide a disc drive which can receive and eject a cartridge without extending any portion of the disc drive past the face of the disc drive.

It is still a further object of the invention to provide a disc drive which has no levers or buttons, which extend from the disc drive while the disc drive is operational so that processing of data will not be disturbed by accidental movement of these members.

It is a further object of the present invention to provide a mechanism for repeatedly and accurately positioning the cartridge with respect to a spindle in the disc drive.

To overcome the disadvantages of the prior art, the disc drive of the present invention includes efficient and economical devices for accurately and repeatedly loading the heads of a disc drive onto the media and unloading the heads without causing damage to either the heads or the media.

It is a further object of the invention to provide such a head loading and unloading mechanism which is operable even when power to the disc drive has been interrupted so as to be able to remove, any cartridge which may contain sensitive or confidential data to a secure location.

It is still a further object of the present invention to provide a mechanism for locking the cartridge into position preparatory to recording on or retrieving data from the media enclosed within the cartridge.

Yet another object of the invention is to provide for the locking of the heads in a position removed from the cartridge as a cartridge is inserted into the drive or ejected from the drive so that there is no damage to the heads or the recording media in the cartridge.

Yet another object of the present invention is to provide for automatic removal of the heads from the cartridge preparatory to ejecting the cartridge from the disc drive.

Another object of the present invention is to provide a crash stop mechanism to prevent the heads from being accidently unloaded from the media during data transfer.

Still a further object of the present invention is to provide a mechanism for automatically urging the heads away from the memory media prior to ejection and a mechanism for locking the heads in a retracted position until a new cartridge is inserted into the drive.

Yet another object of the present invention is to provide an assist mechanism for loading the heads onto the discs in an accelerated manner. Thus the speed of loading is in excess of speed with which the heads can traverse the tracks on the memory media.

Yet another object of the present invention is to provide an assist mechanism for loading the heads slowly onto the disc to prevent damage to head and disc surfaces.

Another object of the present invention is to provide a radial voice coil actuator for the disc drive and a disc drive design with all the above objectives but which can accommodate the increased cartridge access requirements which are not required for a linear voice coil motor or a stepper motor. The radial voice coil motor has the advantage of fast access time and infinite positionability at low cost.

Still another object of the present invention is to provide for a fully interlocked disc drive arrangement during operation when data is transferred to or accessed from a cartridge and also when the drive is not operating.

The present invention includes a disc drive for selectively receiving a cartridge containing a rotatable memory disc comprising a disc drive housing with a cartridge receiving door and a data transfer device for allowing the computer to access data on the disc. The drive further includes a spindle for rotating the discs as data is transferred by the data transfer device. A cartridge receiver device is used for receiving a cartridge and seating the cartridge on the spindle. The cartridge receiver device includes a cartridge load tray and a suspension linkage for pivotally mounting the cartridge load tray to the housing. The tray and the suspension linkage include a forward position above said spindle wherein the tray generally slopes upwardly starting from adjacent the door. The tray in said forward position is adapted to hold a cartridge above said spindle.

The tray includes a middle position substantially parallel to and above the spindle. The middle position is closer to the spindle than the forward position. In the middle position, the cartridge is held in a first seated position on the spindle. The traY finally has a rearward, substantially parallel position above the spindle. This rearward position is farther away from the spindle than the middle position and closer than the forward position. The tray in the rearward position is adapted to hold a cartridge in a second seated position which is more removed from the spindle than a cartridge held in a first seated position.

The present invention also includes the data transfer mechanism having at least one data transfer head and a device for pivotally mounting the head to the housing for radial movement of the head relative to the disc of the cartridge. The drive includes a head unload arm for allowing the head to unload on to a disc. The head unload arm is pivotally mounted to the housing for radial movement towards a disc. Further a head load arm is provided for urging the heads toward the disc, the head load arm being pivotally mounted to the housing for radial movement towards a disc.

The present invention further includes a radial arm voice coil actuator onto which the head is mounted for pivotal movement of the head relative to the cartridge.

The present invention additionally includes a crash stop for selectively retaining the heads in contact with the disc and an interlocking arrangement for lockingly positioning the head and also the cartridge load tray to prevent damage to the head and the disc.

DETAILED DESCRIPTION OF THE PREFERRED EMBODIMENT

Figure 1A:
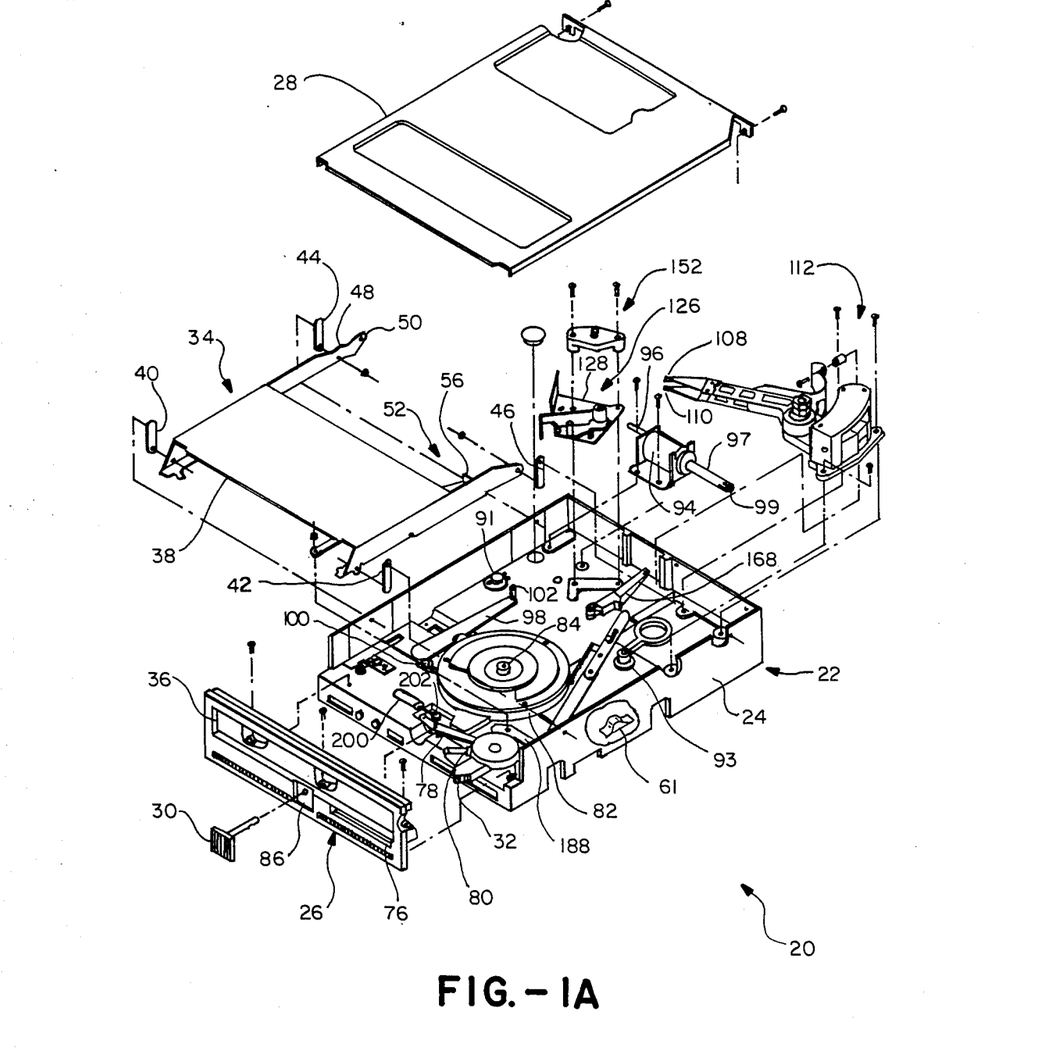
FIG. 1A depicts an exploded view a preferred embodiment of the disc drive of the invention.
Figure 10:
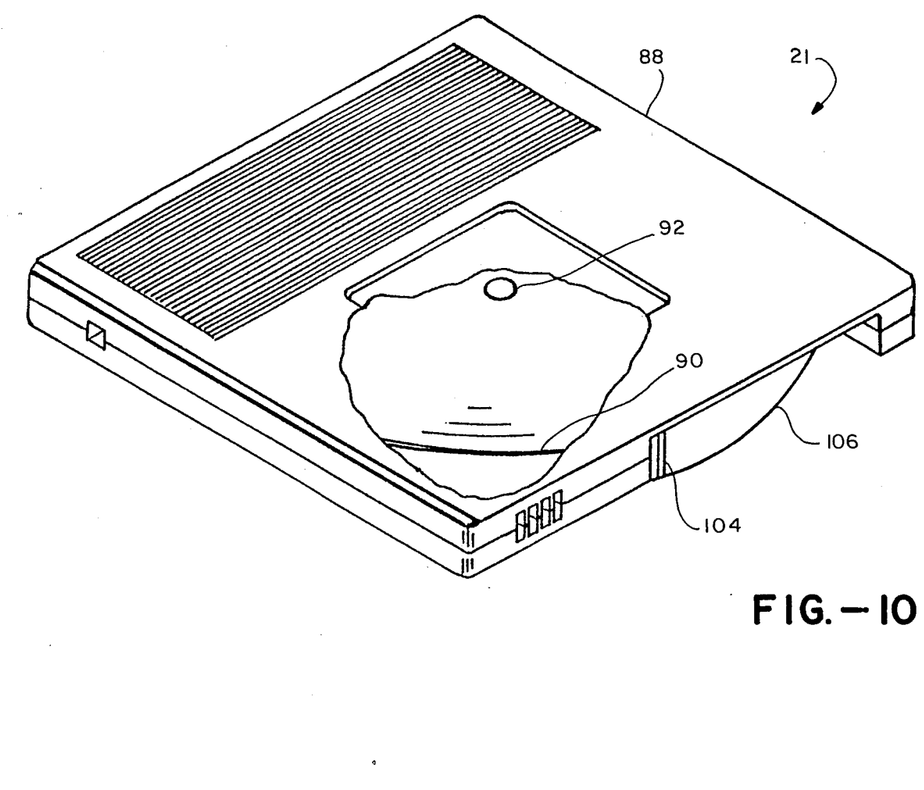
FIG. 10 is a perspective view of a cartridge containing a disc media.

With reference to the figures, in particular FIG. 1A, a preferred embodiment of a disc drive of the present invention is depicted and designated by the numeral 20. Disc drive 20 includes a housing 22 comprised of a base 24, a front panel 26 and a cover 28. FIG. 10 depicts a cartridge 21 which can be used in the disc drive 20. A co-pending application entitled "Removable Cartridge with Lockable Access Door" (U.S. patent application Ser. No. 07/160,714, filed Feb. 26, 1988) and assigned to the present assignee, discusses in greater detail the cartridge and the advantages thereto. As will be discussed more fully below selectively a release button 30 and a cartridge load lever 32 can extend from the front panel 26 during cartridge loading and unloading.

The disc drive includes a cartridge load tray assembly 34 which receives a cartridge such as cartridge 21 (FIG. 10) through door 36 of the front panel 26. The cartridge load tray assembly 34 include a cartridge load tray 38 which is suspended from the housing 22 by two front suspension links 40 and 42 and two rear suspension links 44 and 46. These links are pivotally mounted at the pivot point shown in FIG. 1A to the housing 24 and to the tray 38. As can be seen in FIG. 1A front links 40, 42 are disposed parallel to each other and the rear links 44 and 46 are disposed parallel to each other. However the front links are disposed in a non-parallel relationship with respect to the rear links. The cartridge load tray 38 includes an extension 48 which projects rearwardly of rear suspension link 44 and contains a bore 50. Bore 50 is used for interlocking the tray in a cartridge loaded position which will be discussed more fully below.

Figure 1B:
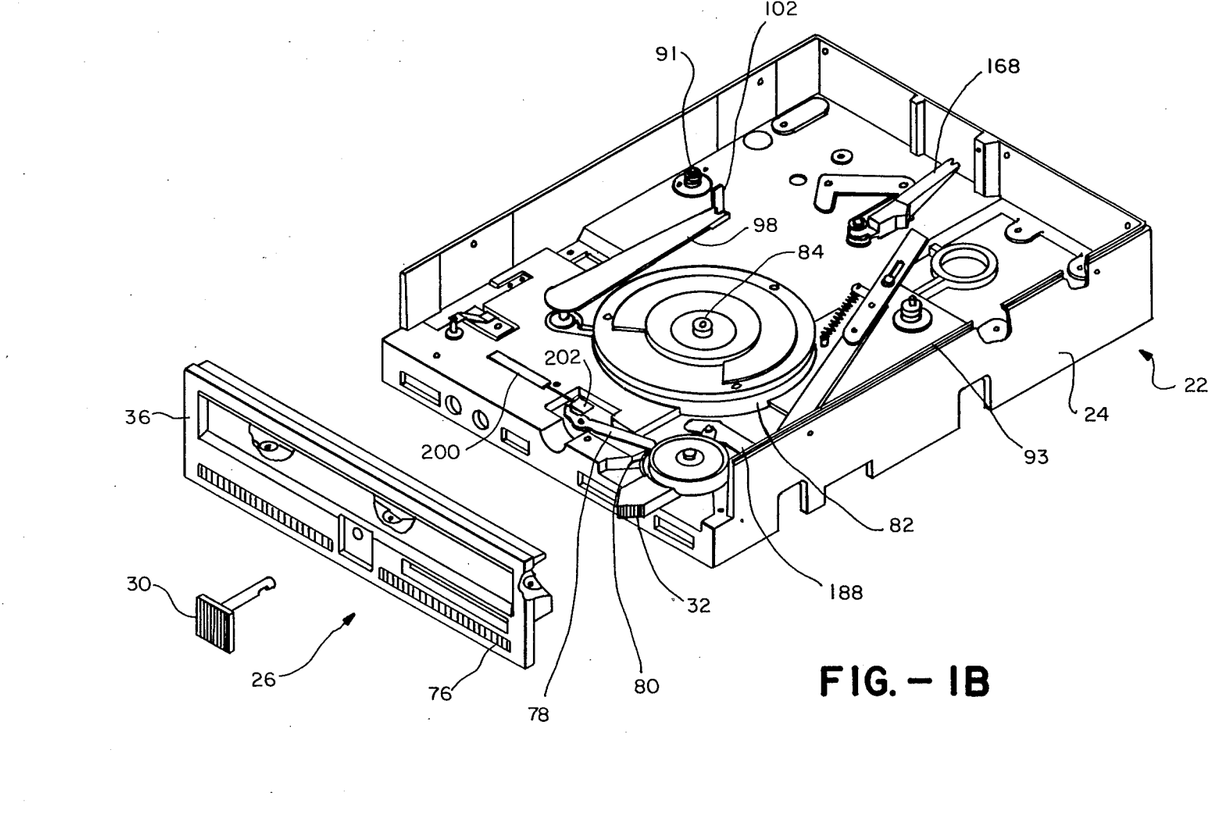
FIGS. 1B, 1C, 1D are enlarged views of portions of FIG. 1A.
Figures 1C, 1D, 2, 8:
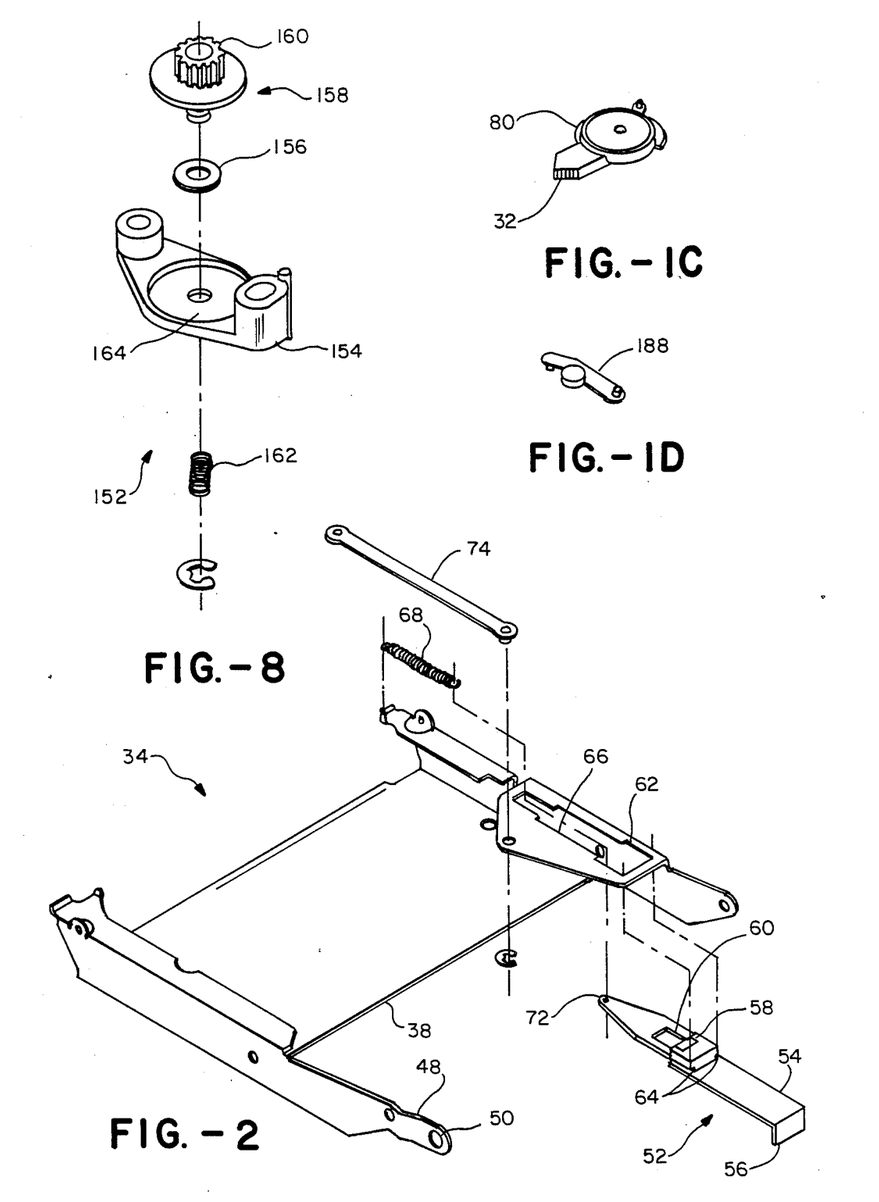
FIG. 2 depicts an inverted view of the cartridge receiver of an embodiment of the invention.
FIG. 8 depicts an inverted view of the damper assembly of an embodiment of the invention.

Viewing FIGS. 1A and 2 together it can be seen that a latch block assembly is depicted and identified by number 52. Latch lock assembly 52 comprises the ejector mechanism which is cocked as the cartridge is inserted into the drive 20 and which causes the cartridge to be automatically ejected from the drive 20. The latch block assembly 52 includes a cartridge latch block 54 which has an outstanding tab 56 which engages the rear portion of the cartridge 21 as it is inserted into the drive 20 in order to cock the latch block assembly 52. It is noted that the cartridge load tray assembly 34 pictured in FIG. 2 is depicted in an inverted position with respect to the manner in which it is actually operable inside of the drive 20 in FIG. 1A. The inverted depiction is provided so as to show further details of the assembly 34. The latch block assembly 52 further includes a cartridge latch roller 58 which is pivotally mounted to the latch block 54 adjacent a port 60 provided in the latch block assembly 52. Latch block assembly 52 is mounted to the tray 38 through a port 62 provided in the underside of tray 38. Latch block assembly 52 includes recesses of 64 which engage with and are positionable along the edges of 66 of port 62 with a portion of the latch block assembly 52 residing on either side of the port 62. A cartridge load spring 68 is operably secured to an end of the tray 38 adjacent the front suspension link 42 and also to an end 72 of the cartridge latch block 54. This spring 68 causes the latch block assembly 52 to be urged toward the front panel 26 in order to provide for ejection of the cartridge when appropriate. Spring 68 further causes tray 38 to be urged toward latch block 54 as latch block 54 is urged rearwardly with the insertion of a cartridge 21 into disc drive 20.

Figure 4:
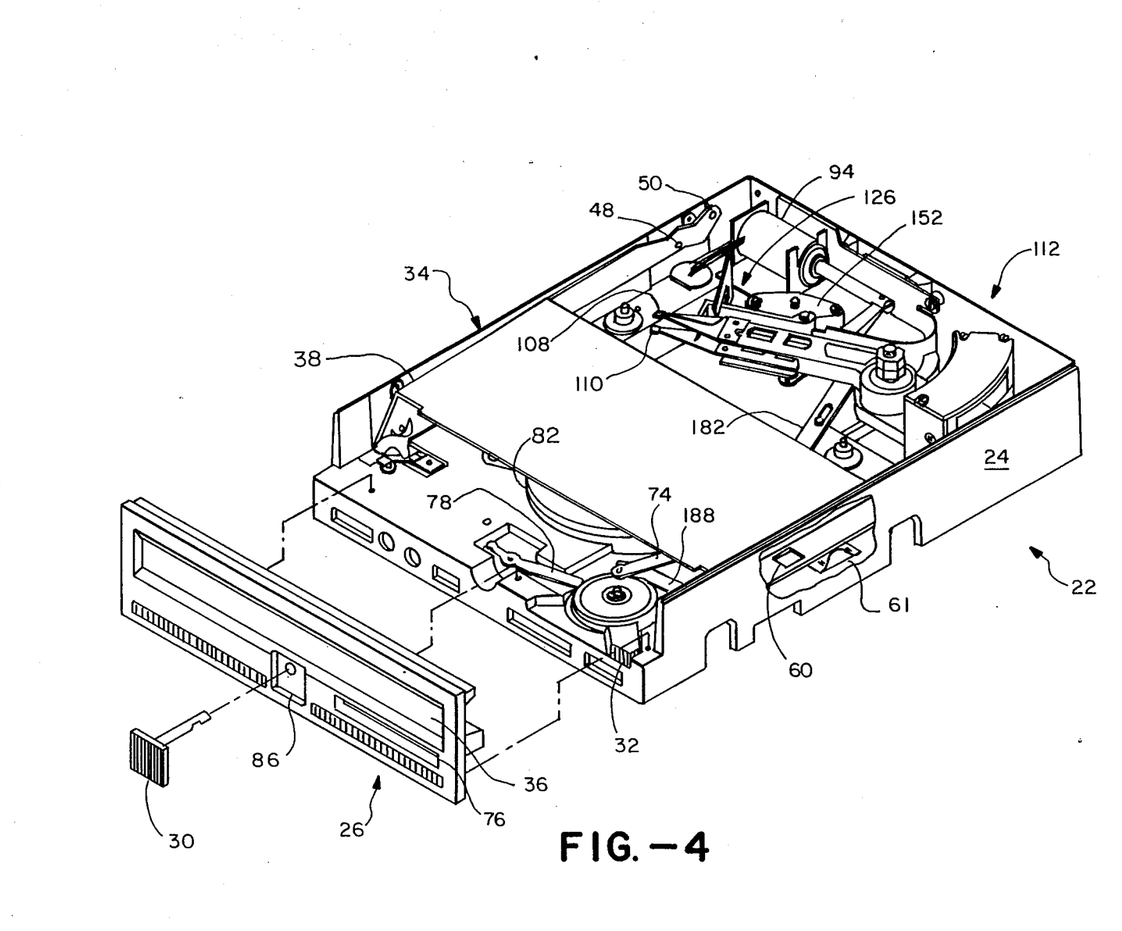
FIG. 4 depicts the disc drive of FIG. 1A with the cartridge receiver in a forward position.

Pivotally secured to the tray 38 adjacent to the port 62 is a tray link arm 74. Tray link arm 74 is pivotally secured to the cartridge load lever 32. As the cartridge load lever 32 is urged to the right from the position shown in FIG. 1A, the tray link arm 74 is urged forwardly toward the front panel 26 causing the latch block assembly 52 to be uncocked allowing the spring 68 to urge the latch block assembly 52 forwardly in an accelerated manner to eject the cartridge. It is to be noted that the cartridge load lever is in a first position as shown in FIG. 4, does not extend from slot 76 of the front panel 26. This is a configuration which is provided to a user prior to the introduction of a cartridge into the drive.

Button 30 engages a stop/start lever 78 which is pivotally mounted to the housing 22 immediately rearwardly of the front panel 26. Lever 78 can engage a tab 80 provided on the cartridge load lever 32.

Beginning with the loading of a cartridge into the drive and ending with the ejection of the cartridge, the cartridge load tray assembly 34, the cartridge load lever 32 and the release button 30 proceed through several positions. Initially prior to the introduction of the cartridge 21 into the drive 20, the tray assembly 34, the cartridge load lever 32 and the release button 30 are as shown in position in FIG. 4. In FIG. 4, the cartridge load lever 32 is pivoted to the right and is recessed so as not to extend out of slot 76 in the front panel 26. The cartridge load tray 38 is in a forward position substantially adjacent to the front panel 26 and slopes upwardly from the front panel 26 toward the rear of the housing 22. The cartridge load tray assembly 34 is substantially above and forward of the spindle motor 82 and spindle 84 which cause a disc disposed thereon to spin. The release button is also mounted in recessed 86 so as not to extend outwardly of the front panel 26.

Figure 5:
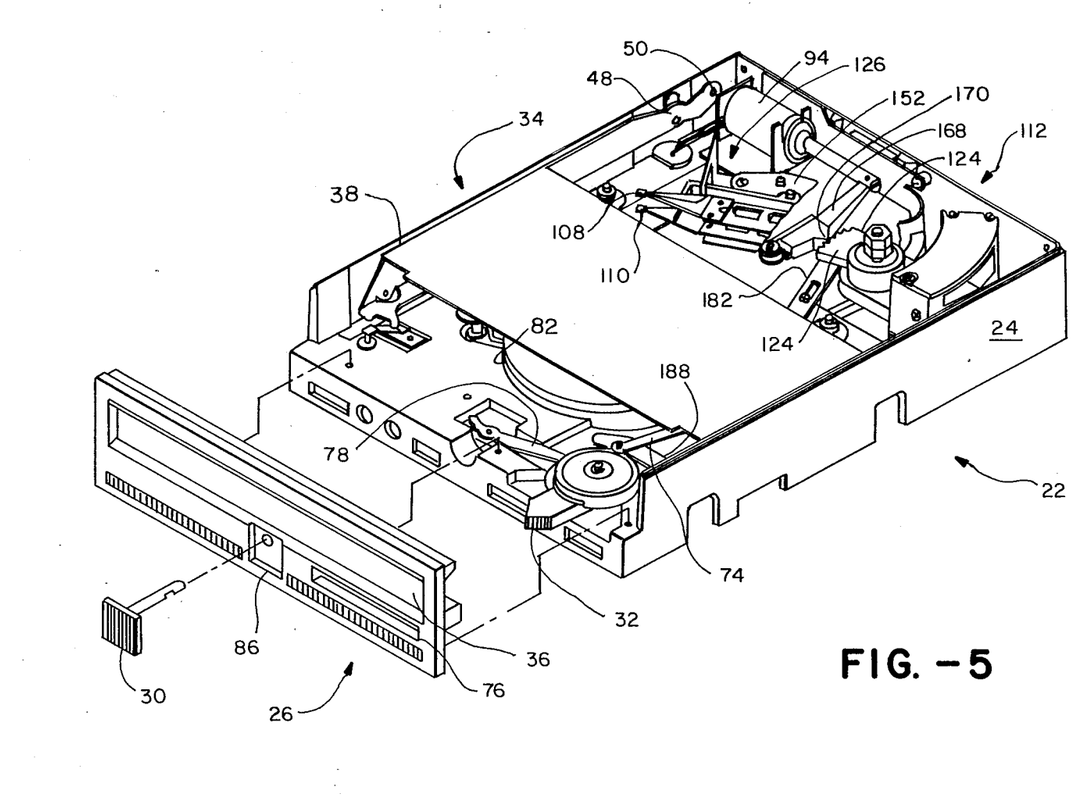
FIG. 5 depicts the disc drive of FIG. 1A with the cartridge receiver in a middle position.
Figure 12A:
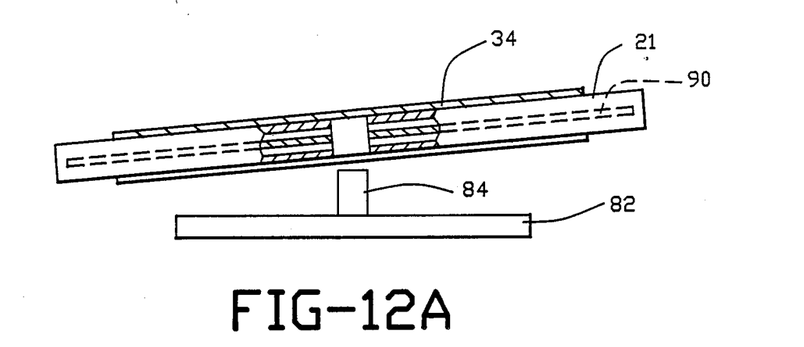
FIGS. 12A, 12B, 12C depict partial cut-away views through FIGS. 4, 5 and 5 respectively, with a cartridge inserted.
Figure 12B:
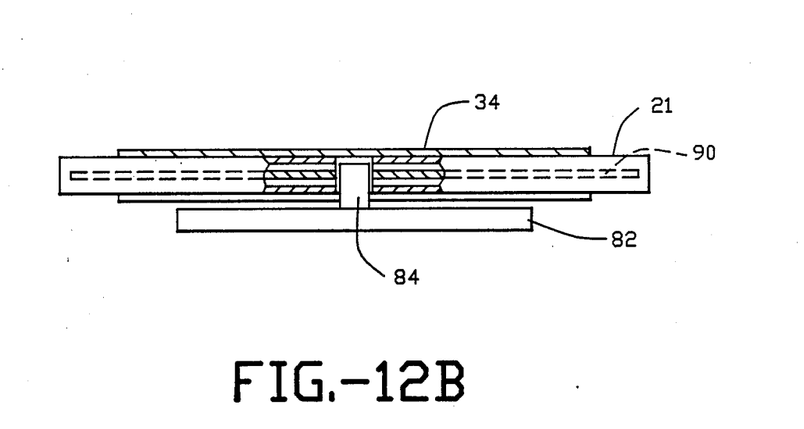

The cartridge can be inserted through the door 36 and into the tray assembly 34. Further urging of the cartridge 21 into the drive 20 causes the cartridge to engage the upstanding tab 56 of the latch block assembly 52, urging the latch block assembly 52 rearwardly independent of the cartridge load tray 38. As the latch block assembly 52 is urged rearwardly, the roller 58 engages and rolls up and over the lobe 61 upstanding from the base 24 of the housing 22. As the latch block assembly 52 is urged more rearwardly by the insertion of the cartridge, the port 60 eventually drops about the lobe 61 causing the latch block assembly 52 to be captured in a rearward position. Substantially simultaneously with the capturing of the latch block assembly 52, the spring 68 causes the tray to pivot on the front and rear suspension links 40, 42, 44, 46 to a middle position more rearwardly of the front panel 26 than the position shown in FIGS. 4 and 12A. This middle position is depicted in FIGS. 5 and 12B. In this position the tray link arm 74 has urged the cartridge load lever 32 forwardly of the front panel 26 to a position where it is operable by an operator. The tray 38 has pivoted to a lower position, from the first forward position shown in FIGS. 4 and 12A and is now substantially parallel to and directly above the spindle. In this position, FIGS. 5, 12B the cartridge held in the tray is urged fully down on the spindle 84 of the spindle motor 82. This causes the hub 92 upon which disc 90 is mounted to fully and accurately engage spindle 84.

Figure 6:
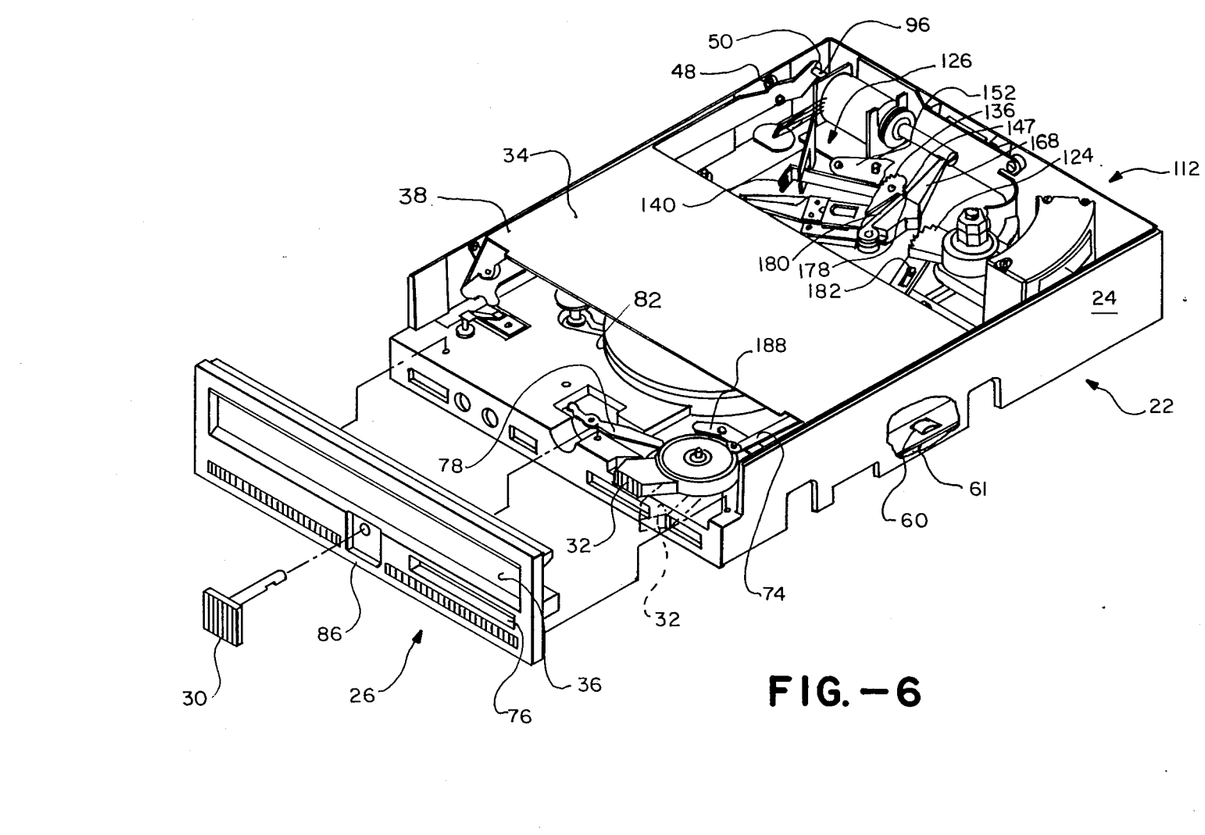
FIG. 6 depicts the disc drive of the invention with a cartridge receiver in a rearward position.
Figure 12C:
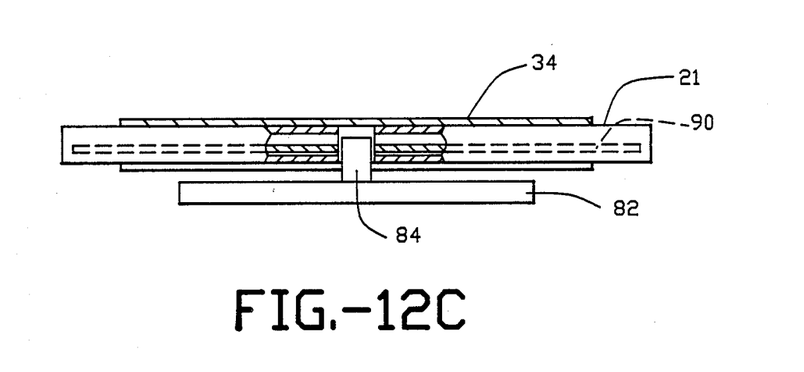

From the middle position, the tray 38 is automatically urged into the rearward position of FIGS. 6, 12C by the spring 68. The lever 32 (shown in phantom in FIG. 6) still extends from the first panel 26 with the tray 38 in this rearward position. As the tray 38 is urged into this rearward position, tray 38 is lifted away from the spindle motor 82 by the action of being pivoted relative to housing 22 by the suspension links. This action causes the housing 88 surrounding the fully seated cartridge 21 to be raised so that the disc 90 inside cartridge 21 is free to turn and not be hindered by the housing 88 with the disc 90 and hub 92 remaining fully and accurately seated on the spindle 84 of the spindle motor. In order to lock the cartridge in its position, the operator then moves a cartridge load lever 32 fully to the left as shown in FIG. 6 so that it is now recessed in slot 76 so that it cannot be accidentally jarred or moved by an operator.

Movement by lever 32 to the left causes movement by the tray link arm 74 pivotally mounted to lever 32 to be positioned in an over-center position with respect to lever 32 without further moving tray 38 which is also pivotally secured to tray link arm 74.

It is be to understood that as the hub of the cartridge is seated on the spindle with the tray 38 in the middle position, the cartridge engages registration pins 91, 93 upstanding from the base 24. These pins prevent lateral motion of cartridge 21. Thus as the tray 38 is urged automatically to the rearward position by the spring 68 and as the tray 38 and cartridge housing 88 are urged upwardly from the spindle 84, the tray 38 slides relative to the cartridge 21.

With the cartridge in this most rearward position, a solenoid 94 or other appropriate mechanism causes a pin 96 to be inserted through properly aligned bore 50 of the tray 38 in order to fully secure the tray in the rearward position.

Simultaneous with the urging of the cartridge load lever 32 to the left position, the button 86 is urged slightly forwardly in the recess 86 by the tab 80 pivoting the start/stop lever 78. Accordingly the cartridge is fully, properly and accurately seated on the spindle 84 of the spindle motor 82 and locked into position with the cartridge load lever 32 and the release button 30 positioned below the surface of the front panel 26 so as to prevent accidental manipulation thereof.

Ejection of the cartridge is caused by the reverse of the above, proceeding from FIG. 6 through FIG. 5 and ending at FIG. 4. Initially the release button 30 is depressed urging the cartridge load lever 32 into the middle position as shown in FIGS. 5 and 6, extending outwardly from the front panel 26. The tray is still in the most rearward position as shown in FIG. 6. The cartridge load level 32 is then urged to the right position as shown in FIG. 4. As this occurs, the cartridge load tray 38 is urged forwardly proceeding automatically from the most rearward to the middle and finally to the most forward position. As this occurs, the roller 58 of the latch block assembly 52 rolls up and over the lobe 61 upstanding from the base 24 causing the latch block assembly 52 to become uncocked with the result that cartridge load spring 68 urges the cartridge latch block 54 and the tab 56 upstanding therefrom forwardly at a rapid rate causing the cartridge to be urged out of the door 36 by the upstanding tab 56.

Pivotally mounted to the base 24 is a shutter lever 98. Shutter lever 98 is pivotally urged to a cartridge shutter engaging position by shutter lever spring 100. As a cartridge is inserted into the cartridge load tray assembly 34, a tab 102 upstanding from the shutter lever 98 engages a tab 104 mounted on the cartridge shutter 106 in order to urge the cartridge shutter 106 open is more fully described in the above referenced co-pending patent application. As the door is opened, the shutter lever is caused to pivot leftwardly in FIG. 1A away from the spindle motor 82, and in a counterclockwise manner.

In a preferred embodiment, two heads, 108 and 110 are mounted on a radial arm voice coil actuator assembly 112. This assembly or head assembly 112 is mounted at the rear of the base 24 as can be seen in FIG. 1A.

Figures 7, 9:
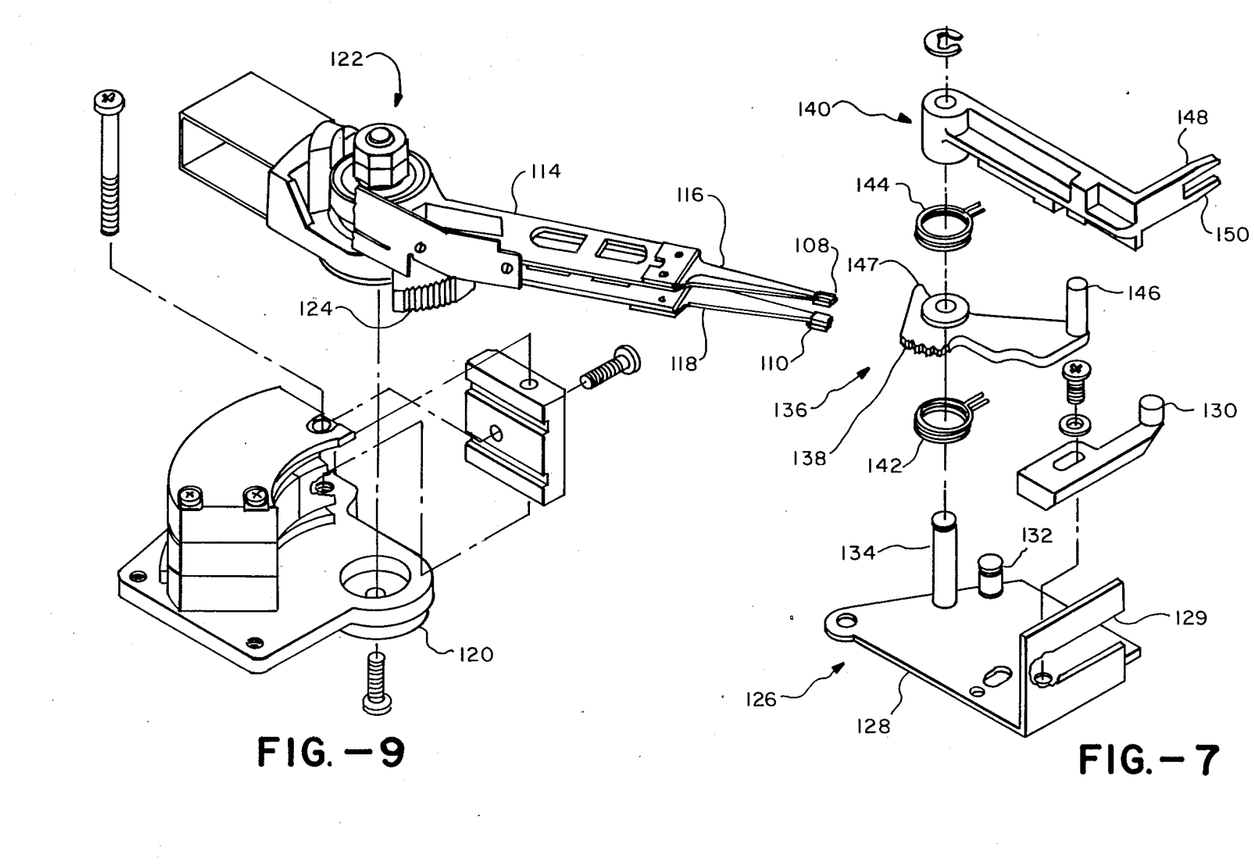
FIG. 7 depicts an exploded view of an arm control assembly of an embodiment of the invention.
FIG. 9 depicts an exploded view of the radial arm voice coil actuator of an embodiment of the invention.

As can be seen in FIG. 9, this assembly 112 includes a bifurcated head arm 114, to which is mounted an upper flexure 116 and a lower flexure 118. At the end of the flexures are mounted the above heads 108 and 110. Due to the flexures 116 and 118, the distance between the heads 108 and 110 can vary during the operation of the drive 20. The head arm 114 is mounted on the head arm frame 120 by a head arm spindle assembly 122. The head arm frame 120 includes the electromagnet of the actuator 112. Mounted to and below the head arm 114 is a ratchet 124 which in combination with a pawl as discussed below, enables the head arm 114 and the heads 108 and 110 to be locked in a rearward position prior to the introduction of a cartridge 21 into the drive 20 and also prior to the ejection of the cartridge 21 from the drive 20.

In FIG. 1A an arm control assembly 126 is depicted which can be seen in greater detail in FIG. 7. The arm control assembly 126 includes a base plate 128 to which is mounted stops 130 and 132 and pivot axis 134. A head load arm 136 having a partial gear 138 integral therewith is first mounted on the pivot axis 134 followed by a head load arm 140. The head load arm 136 further includes an integrated stop 147. Each of the arms 136 and 140 are spring biased by arms springs 142 and 144 respectively such that both arms are urged forwardly toward the front panel 26 until they are stopped by stops 132 and 130 respectively. In a retracted position head load arm 140 rests in a U-shaped groove 129 of base plate 128. As can be seen in FIGS. 1A and 7 together, head load arm 136 includes an upstanding post 146 which is used to urge the head arm 114 (FIG. 9) forwardly as will be described herein below. The flexures 116, 118 to which are mounted upper and lower heads 108 and 110, are separated by and can rest upon the ramped prongs 148 and 150 which project at approximately a right angle from the rest of the head load arm 140.

As can be seen in FIG. 1A, a damper assembly 152 is mounted to the base plate 128 of the arm control assembly 126. Damper assembly 152 include (as can be seen in the inverted depiction of FIG. 8) a damper frame 154, a damper washer 156 and a damper rotor 158 which includes a gear 160. A spring 162 holds the damper motor 158 tightly against the damper frame 154. A damping agent and lubricant such as for example Andoc C is provided between the damper frame 164 and the damper rotor 160 to provide for damping. As can be seen in FIG. 1A, the damper assembly 152 of FIG. 7 is inverted and mounted on the arm control assembly 126 such that the damper rotor 158 and in particular the gear 160 engages with the partial gear 138 of the head load arm 136.

Figure 11:
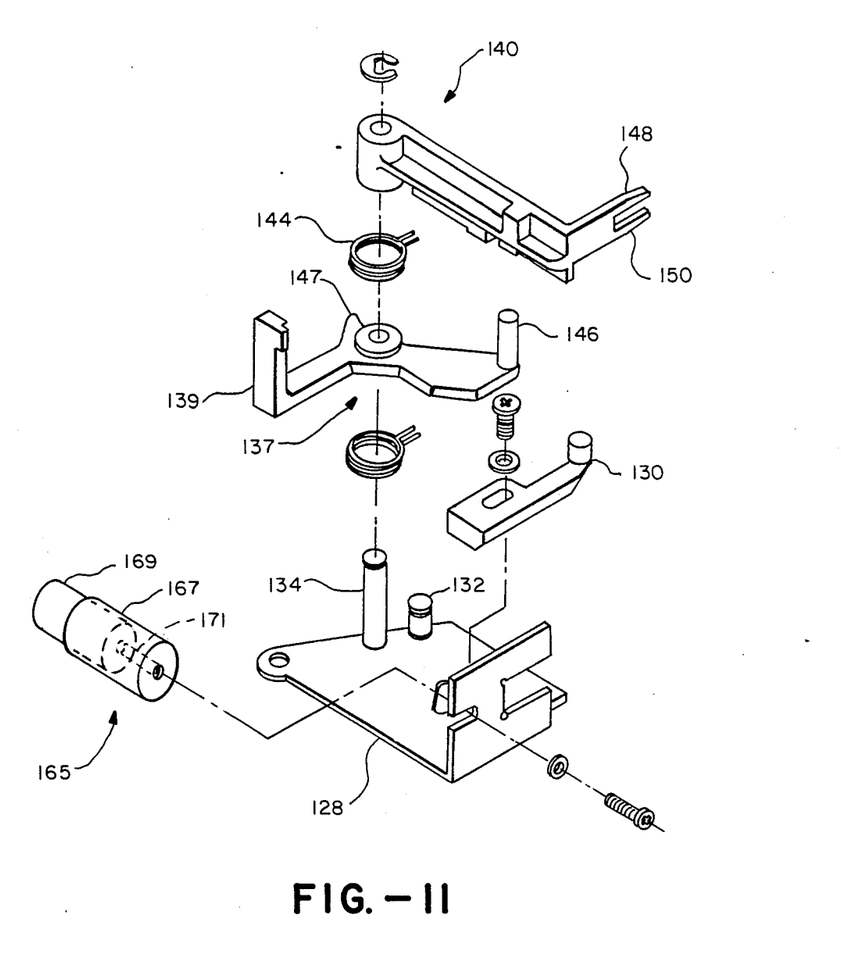
FIG. 11 is an alternative embodiment of a damping mechanism of the invention.

An alternate embodiment of the arm control assembly 126 is shown in FIG. 11. In this embodiment, an air damper assembly 165 replaces the damper assembly of FIG. 8. The air damper assembly 165 includes an air cylinder 167 in which is mounted a piston 69. A spring 171 provides a resilient connection between the cylinder 167 and the piston 169. The head load arm 136 of the embodiment shown in FIG. 7 is replaced by a new head load arm 137 as shown in FIG. 11. This new head load arm 137 includes a piston arm 139 which can engage with and push upon the piston 169 in order to slow down the rotation of the head load arm 137 about its axis of rotation as the head load arm 137 urges the loading of the heads onto the disc.

Figure 3:
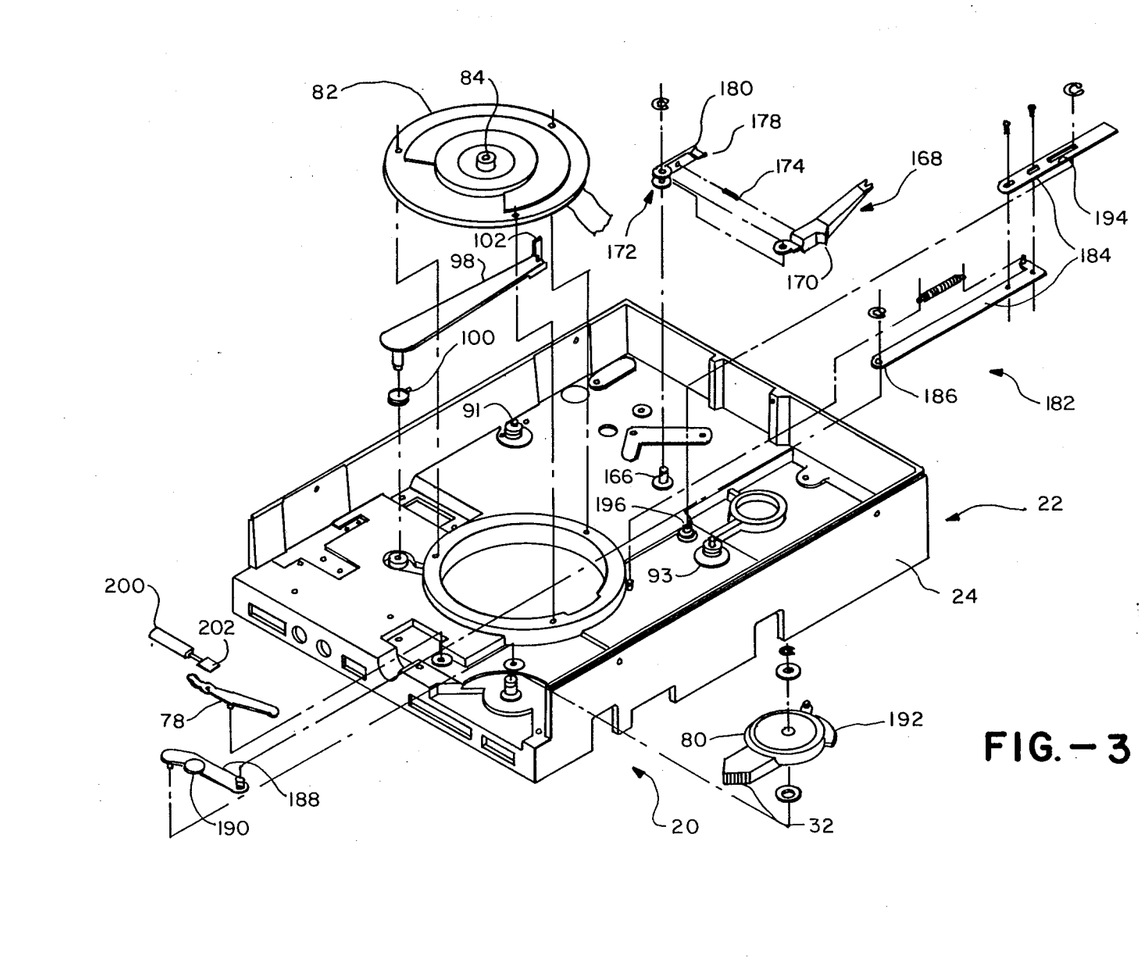
FIG. 3 is an exploded view of an embodiment of the invention in accordance with FIG. 1A with some of the parts removed to reveal greater detail of other parts.

Pivotally secured to the base 24 by upstanding pivot axis 166 is a head arm brake pawl 168 as can be seen in FIG. 3. Head arm brake pawl 168 includes a projection 170 which can extend into and engage with the ratchet 124 of the head arm 114 radial arm voice coil actuator assembly 112 to lock the position of the head arm 114 and the heads 108 and 110 rearwardly of a cartridge so there would be no damage to the heads or the disc as the cartridge is inserted into the drive 20. Additionally, pivotally mounted to the pivot axis 166 and operatively secured to the head arm brake pawl 168 is an outer crash stop 172. A crash stop spring 174 is positioned between arm brake pawl 168 and outer crash stop 172 in order to urge out of crash stop 172 away from head arm brake pawl 168. A tab 176 extending from the outer crash stop 172 engages a portion of head arm brake pawl 168 in such a manner as to limit the distance away from the head arm brake pawl 168 that the crash stop spring 174 can urge the outer crash stop 172. As will be discussed more fully herein below, the outer crash stop 172 is operably engagable with the stop 147 of the head load arm 136.

The solenoid 94 includes a central shaft 97 which extends from the opposite end from which pin 96 extends and which is integral with pin 96. The upper end of head arm brake pawl 168 is pivotally secured to the end of central shaft 97 at pivot point 99. Simultaneous with the locking of the tray assembly 34 in a rearward position by the pin 96, the central shaft 97 urges the head arm brake pawl 168 leftwardly releasing the pawl projection 170 from the ratchet 124 allowing the heads to be urged towards the cartridge by the arm control assembly 126 in the following manner. In a more accelerated manner than the heads 108 and 110 can be moved across the disc by the radial arm voice coil assembly 122, the head unload arm 140 carries the separated heads towards the inserted disc as the head load arm 136 and in particular the upstanding post 146 urges the head arm 114 toward the disc. The head unload arm 140 is stopped by stop 130 when the prongs 148 and 150 are disposed on either side of the disc and then the head load arm 136 in conjunction with the standing post 146 continues to urge the head arm 114 about the disc such that the flexures 116 and 118 and the bifurcated end of the head arm 114 stradle the disc and the heads 108 and 110 are loaded onto the surface of the disc (FIGS. 4, 5 and 6). In the preferred embodiment this occurs after the cartridge and the disc have been fully seated on the spindle and locked into position by the pin 96 but prior to the beginning of the spinning of the disc. In other words the heads are stationary relative to the disc prior to the discs being spun up to speed. This is to ensure that there is no damage to the heads or the discs during the above indicated loading operation. Similarly during the unloading operation, the disc is fully stopped prior to the delivery of the heads to the head unload arm 140 as discussed below.

Prior to the placement of the heads on the disc, the stop 147 of the head load arm 136 engages the outer crash stop 172 and compresses the spring 174 as the stop 147 urges the outer crash stop 172 towards the head arm brake pawl 168. Once the heads are loaded onto the disc, the stop 147 is pivoted to a position out of the way of the outer crash stop 172 in order to allow the other crash stop 172 to be urged away from the head arm brake pawl 168 (FIG. 6). In this position, the outer crash stop 172 prevents the heads from unloading off of the disc. This is accomplished as follows, should for any reason the head begin to pivot off of the disc, the head arm 114 would contact the upstanding post 146 of the head load arm 136 urging head load arm 176 to pivot in a clockwise manner. This would cause the stop 147 of the head load arm 136 to additionally pivot clockwise to a point where it would engage the end 180 of the outer crash stop 172 preventing further movement <,f the head load arm 136 and the heads off of the disc. Thus the heads are prevented from being removed from the disc during operation when the disc is rotating.

A head retract assembly 182 is operably secured to the cartridge load lever 32 in order to urge the head arm 114 of the radial arm voice coil actuator assembly 112 rearwardly so as to cause the pawl projection 170 to engage the ratchet 124 when the solenoid is denergized. This occurs when the cartridge load lever 32 is urged to the right position preparatory to ejection of the cartridge from the housing. Thus preparatory to introducing a new cartridge into the housing, the heads are locked rearwardly by the above assembly 182.

The head retract assembly 182 include a two part retract link 184 which is pivotally secured at one end 186 to a retract lever 188. The retract lever 188 is pivotally secured at the other end to the base 24. The retract lever includes a roller 190 which can roll on cam surface 192 of the cartridge load lever 32. The retract link 184 includes an elongated slot 194 through which projects a pin 196 on the base 24. An appropriate clip is provided for ensuring that the retract link 184 is securely fastened to the pin 196 such that the retract link 184 is movable relative to the pin 196 according to the limits of the slot 194. Thus, as the cartridge load lever 32 is urged rightwardly, to the initial position for lever 32 in FIG. 1, the cam surface 192 thereof urges roller 190 and the retract lever 188 rearwardly causing the head retract link 184 to be urged rearwardly. The end 198 of the retract& link 184 is urged against the head arm 114 moving the head arm 114 to a rearward position such that the pawl projections 170 engages and locks the ratchet 124 and thus heads in a rearward position.

The present invention further includes a locking mechanism for locking the release button 30 so that it cannot be actuated in order to start the process for ejecting the cartridge. This mechanism includes a solenoid 200 and a block 202. This mechanism is used to provide a time delay to insure that the disc in the cartridge has stopped spinning before it is possible to push release button 30 in order to remove the cartridge from the drive.

INDUSTRIAL APPLICABILITY

The operation of the drive 20 is as follows. Beginning with the configuration of FIG. 4, the cartridge 21 is inserted into the drive 20 through the door 36 of the front plate 26. This causes the tray 38 to proceed through the positions indicated in FIGS. 4, 5 and 6 as discussed above so the cartridge 21 is fully seated on the spindle 84. During this time the ratchet 124 and pawl projection 170 keep the heads in a rearward position. The cartridge load lever 32 pops out as the cartridge is inserted and the block latch assembly 52 is cocked providing for ejection at a later point in the operation. Further as the cartridge is inserted the shutter lever 98 ensures that the shutter 106 of the cartridge 21 is opened. After the cartridge 21 has been properly seated, the solenoid 94 causes the pin 96 to be inserted through the bore 50 and the cartridge tray 38, locking the tray 38 and the cartridge 21 into position, and simultaneously removing the pawl projection 170 from the ratchet 124. The arm control assembly 126 then automatically causes the heads to load onto the disc 90 in an accelerated manner and the outer crash stop 172 is set. As the bore is occurring the operation can urge the load lever 34 to a leftward position flush with the front panel 26. Then the disc is spun up to running speed by the spindle motor 82. In this mode the lever 32 and the button 30 do not extend from the front base and thus there can be no accidental actuation of the lever or the button.

For unloading the cartridge, the button 30 is pushed causing the electronic circuitry (not shown) of the drive 20 to stop the spinning of the spindle 84 and the disc and simultaneously to pop the cartridge load lever 32 out of the front panel 26 as depicted by FIG. 5. Once the disc is stationary, the solenoid 94 releases the tray 38 and moves the pawl projection 170 closer to the ratchet 124. The cartridge load lever 32 is urged to the right as shown in FIG. 5 causing the head retract assembly 182 to urge the head arm 114 rearwardly so that the pawl projection 170 engages the ratchet 124, locking the heads in a rearward position. Simultaneously this motion for lever 32 pulls tray link arm 74 forwardly causing the tray 38 to be urged forwardly until the latch block assembly 52 ejects the cartridge 21 from the drive 20.

From the above it can be seen that the present invention has a distinct advantages due to its compact cartridge receiver mechanism which positively engages a cartridge with the spindle, due to the head placement mechanism including the arm control assembly 126, due to the radial arm voice coil actuator assembly 112, and due to the interlocking mechanisms for protecting the heads and media inside the cartridge.

Other objects and advantages of the invention can be obtained from a review of the claims and the figures. It is to be understood by one of ordinary skill in the art that further embodiments of the present invention can be presented and fall within the scope of the invention.

I claim:

1. A disc drive for selectively receiving a cartridge containing a rotatable memory disc comprising:
   a disc drive housing with a cartridge receiving door;
   a head assembly for transferring data between the disc drive and the disc;
   said head assembly including at least one data transfer head;

said head assembly including means for pivotally mounting said head to said housing for causing selected radial movement of the head relative to the disc;

first head loading means for loading the head onto the disc and for supporting said head;

first mounting means for pivotally mounting said first head loading means to said housing for radial movement toward the disc;

first biasing means for biasing said first head loading means toward the disc; and second head loading means for loading said head onto the disc in a more accelerated manner than caused by said first head loading means;

second mounting means for pivotally mounting said second head loading means to said housing for radial movement toward the disc; and second biasing means for biasing said second head loading means toward the disc.

2. The apparatus of claim 1 wherein:
said first head loading means and said second head loading means are mounted to said housing in such a way that said first head loading means and said second head loading means can pivot simultaneously toward the disc to load said head onto the disc.

3. The apparatus of claim 2 including:
means for stopping the movement of said first head loading means toward the disc while allowing said second head loading means to continue to urge said head toward the disc and off of said first head loading means.

4. The apparatus of claim 1 wherein:
said first head loading means has means for urging said head away from the surface of the disc during head unloading off of the disc and for setting said head onto the disc during head loading.

5. The apparatus of claim 1 wherein:
said head assembly pivotally mounting means includes a flexible arm;
third means for mounting said head on said flexible arm; and
said first head loading means includes a ramped surface for receiving said flexible arm and simultaneously urging said head off of the surface of the disc.

6. The apparatus of claim 1 including means for locking said head assembly in a position away from the cartridge.

7. The apparatus of claim 6 wherein said locking means includes:
a ratchet attached to said head assembly pivotally mounting means; and
a means defining a pawl movably mounted to said housing for selectively engaging said ratchet to lock said head in a position away from the position of the cartridge.

8. The apparatus of claim 7 including:
means for selectively unlocking said head by urging said pawl defining means away from said ratchet.

9. The apparatus of claim 8 including:
means for receiving a cartridge;
means for locking the cartridge receiving means in a position;
wherein said unlocking means includes means for unlocking said cartridge receiving means simultaneously with the urging of the pawl defining means away from the said ratchet.

10. The apparatus of claim 7 including a means for preventing the head from leaving the disc and crashing, said head preventing means mounted on said pawl defining means.

11. The apparatus of claim 10 including:
means for pivotally mounting said head crashing preventing means to said pawl defining means; and
means for urging said head crashing preventing means away from said pawl defining means.

12. The apparatus of claim 11 including:
said second head loading means including a crash stop tab;
said head crashing preventing means pivotable to a position away from the pawl defining means and engagable with said crash stop tab as said head is urged onto the disc to prevent said head from coming off the disc.

13. The apparatus of claim 1 including means for preventing the head from leaving the disc.

14. The apparatus of claim 1 including:
means for damping the movement of the second head loading means.

15. The apparatus of claim 14 wherein:
said damping means includes a rotor having a first gear, a damping frame and a damping agent located between said rotor and said frame; and
wherein said second head loading means includes a second gear which engages the first gear of said damping means so as to damp the movement of the second head loading means.

16. The apparatus of claim 14 wherein said damping means includes a piston disposed in a cylinder for damping the movement of the said second head loading means.

17. The apparatus of claim 16 including a spring linking the piston to the cylinder.

18. The apparatus of claim 1 including;
means for stopping the movement of the second head loading means toward the position of the cartridge.

19. The apparatus of claim 1 wherein:
said head assembly means includes a radial voice coil actuator means for selectively positioning said head radially relative to a disk.

20. A disc drive with a rotatable memory disc comprising:
a disc drive housing;
a head assembly for transferring data between the disc drive and the disc;
said head assembly including at least one data transfer head;
said head assembly including means for pivotally mounting said head to said housing for causing selected radial movement of the head relative to the disc;
first head loading means for loading the head onto the disc and for supporting said head;
first mounting means for pivotally mounting said first head loading means to said housing for radial movement toward the disc;
first biasing means for biasing said first head loading means toward the disc;
second head loading means for loading said head onto the disc in a more accelerated manner than caused by said first head loading means;
second mounting means for pivotally mounting said second head loading means to said housing for radial movement toward the disc; and second biasing means for biasing said second head loading means toward the disc.

21. A disc drive with a rotatable memory disc comprising:
a disc drive housing;
a head assembly for transferring data between the disc drive and the disc;
said head assembly including at least one data transfer head;
said head assembly including means for pivotally mounting said head to said housing for causing selected radial movement of the head, back and forth along a radius of the disc from a position away from the disc to a position adjacent the disc;
first head loading means for loading the head onto the disc and for supporting said head;
first mounting means for pivotally mounting said first head loading means to said housing so that said first head loading means can move back and forth along a radius of the disc from a position away from the disc to a position adjacent the disc;
first biasing means for biasing said first head loading means for movement towards and along a radius of the disc.

* * * * *